(12) United States Patent
McDonald et al.

(10) Patent No.: US 8,756,063 B2
(45) Date of Patent: Jun. 17, 2014

(54) HANDHELD VOICE ACTIVATED SPELLING DEVICE

(76) Inventors: Samuel A. McDonald, Warrensville Heights, OH (US); William H. McDonald, Warrensville Heights, OH (US); Regina McDonald, Warrensville Heights, OH (US)

( * ) Notice: Subject to any disclaimer, the term of this patent is extended or adjusted under 35 U.S.C. 154(b) by 1580 days.

(21) Appl. No.: 11/986,180

(22) Filed: Nov. 20, 2007

(65) Prior Publication Data
US 2008/0120110 A1    May 22, 2008

Related U.S. Application Data

(60) Provisional application No. 60/860,348, filed on Nov. 20, 2006.

(51) Int. Cl.
*G10L 15/18* (2013.01)
*G10L 21/00* (2013.01)

(52) U.S. Cl.
USPC .......................................... 704/257; 704/270

(58) Field of Classification Search
USPC ..................... 704/251, 254, 257, 270, 9, 10
See application file for complete search history.

(56) References Cited

U.S. PATENT DOCUMENTS

| 4,758,955 A | 7/1988 | Chen |
| 4,830,618 A | 5/1989 | David |
| 5,113,340 A | 5/1992 | McWherter |
| 5,210,853 A * | 5/1993 | Nakasuji et al. ................. 1/1 |
| 6,304,844 B1 | 10/2001 | Pan et al. |
| 6,331,867 B1 * | 12/2001 | Eberhard et al. ............ 715/864 |
| 7,227,528 B2 * | 6/2007 | Goszyk et al. ............... 345/156 |
| 2007/0016420 A1 * | 1/2007 | Azulai et al. ................. 704/254 |
| 2007/0112554 A1 * | 5/2007 | Goradia ............................ 704/4 |
| 2007/0255570 A1 * | 11/2007 | Annaz et al. ................. 704/270 |

* cited by examiner

*Primary Examiner* — Angela A Armstrong
(74) *Attorney, Agent, or Firm* — James Ray & Assoc

(57) ABSTRACT

A handheld voice activated spelling device includes a housing and a cover secured to the housing. A power source and microphone are mounted within the housing and control switches are operable from the front surface of the housing. A first memory has a plurality of words stored therein. A second memory has a plurality of word definitions stored therein, each associated with a respective word. A speech recognition apparatus is coupled to the microphone and to the first memory and responsive to the electronic signals generated by the microphone for selecting at least one word from the first memory representative of the specific word spoken by the user. A display is provided for displaying the plurality of words and the plurality of word definitions when the user operates a selected control switch. A related word classification can be also selected from a third memory and displayed on the display.

3 Claims, 1 Drawing Sheet

HANDHELD VOICE ACTIVATED SPELLING DEVICE

CROSS-REFERENCE TO RELATED APPLICATIONS

This application is related to and claims priority from U.S. Provisional Patent Application Ser. No. 60/860,348 filed on Nov. 20, 2006.

FIELD OF THE INVENTION

The present invention relates, in general, to voice activated spelling devices and, more particularly, this invention relates to a handheld voice activated spelling device capable of displaying spelling selections, their definitions and classifications based on receiving and manipulating voice data.

BACKGROUND OF THE INVENTION

As is generally well known, many individuals require proper spelling and use of words in a correct context but often find themselves disadvantaged in obtaining such proper spelling. While a traditional dictionary will provide proper spelling, definition and classification, the individual must at least know the correct beginning of the word in order to begin their search. This poses disadvantage when the word features, for example, a silent first letter. Furthermore, the use of traditional dictionary is associated with a greater than desirable weight which is cumbersome to many, particularly students and the like individuals who must carry many more important textbooks. It is further generally known that smaller-sized dictionary versions often omit words in order to reduce the size and weight.

Prior to the conception and design of the present invention, efforts have been made to alleviate difficulties in obtaining proper word spelling.

U.S. Pat. No. 4,830,618 issued to David et al. and U.S. Pat. No. 4,758,955 issued to Chen provide handheld electronic spelling devices featuring conventional keyboard. However the use of the keyboard requires greater than desirable effort to obtain correct spelling. Furthermore, such prior art devices do not provide associative word definitions and classifications.

U.S. Pat. No. 6,304,844 issued to Pan et al. discloses a speech recognition apparatus for mobile phones, PDAs and other communication devices. Such apparatus includes a microphone, display, word database and speech recognition software capable of receiving and processing acoustic waves representative of the voice message, selecting an associated word from the word database and displaying such associated word on the display. While use of the speech recognition reduces the effort in obtaining proper spelling, the apparatus of Chen et al. does not provide associative word definitions and classifications.

Therefore, there is a need for an improved handheld device for determining proper word spelling and aiding in proper use of such word.

SUMMARY OF THE INVENTION

The invention provides a handheld voice activated spelling device. The device includes a housing. The housing has a front surface and an opposed rear surface. A cover is provided and is secured to the housing for selectively covering and uncovering the front surface. A power source is mounted within the housing. A microphone means is provided for receiving acoustic waves each characterizing a specific word spoken by a user and converting the acoustic waves into electronic signals. At least one control switch is provided and is operable by a user. There is a first memory means which has a plurality of words stored therein. A speech recognition means is coupled to the microphone means and to the first memory means. The speech recognition means is responsive to the electronic signals for selecting at least one word from the first memory means. Such at least one word is representative of the specific word pronounced by the user. A second memory means is provided and coupled to the first memory means. The second memory means contains a plurality of word definitions stored therein. Each word definition is associated with a respective word stored in the first memory means. The second memory means is being responsive to the at least one control switch for providing the such word definition. A display means is mounted within the housing and having a display viewable from the front surface thereof, the display means coupled to each of the first and second memory means for displaying the plurality of words and the plurality of word definitions when the user operates the at least one control switch.

OBJECTS OF THE INVENTION

It is, therefore, one of the primary objects of the present invention to provide a handheld voice activated spelling device.

Another object of the present invention is to provide a handheld voice activated spelling device that is relatively inexpensive to manufacture.

Yet another object of the present invention is to provide a handheld voice activated spelling device that is simple to use.

A further object of the present invention is to provide a handheld voice activated spelling device that stores and displays word definitions.

Yet a further object of the present invention is to provide a handheld voice activated spelling device that stores and displays word classifications.

An additional object of the present invention is to provide a handheld voice activated spelling device that is capable of displaying chronological date and time.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 1:
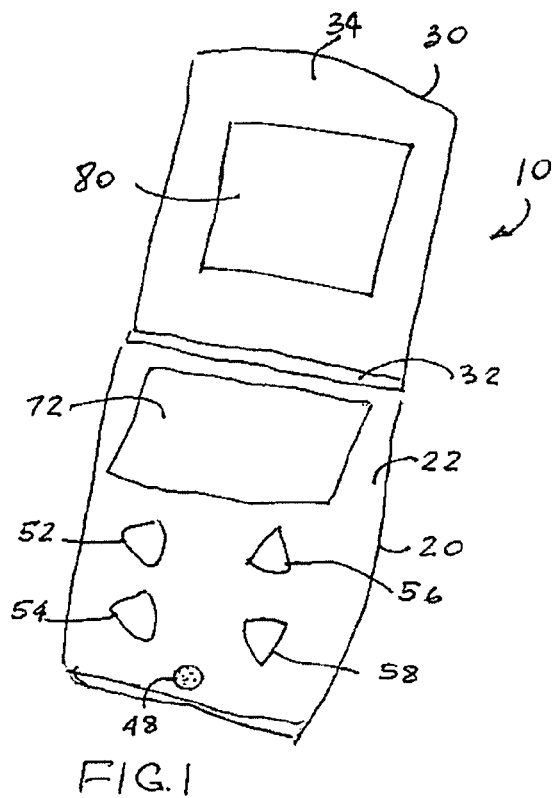
FIG. 1 is a perspective view of a handheld voice activated spelling device of the present invention.

Prior to proceeding to the more detailed description of the present invention, it should be noted that, for the sake of clarity and understanding, identical components which have identical functions have been identified with identical reference numerals throughout the several views illustrated in the drawing figures.

The present invention overcomes the disadvantages of prior art spelling devices by providing a handheld voice activated spelling device which is simple to use and which not only provides the user with proper spelling of a spoken word but also provides the user with a related definition and classification thus aiding the user in proper use of the spelled word.

Figure 2:
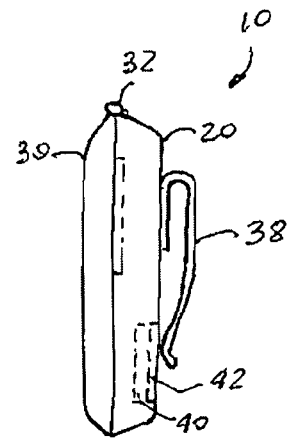
FIG. 2 is a side view of the device of FIG. 1, particularly illustrating the cover in a closed position.
Figure 3:
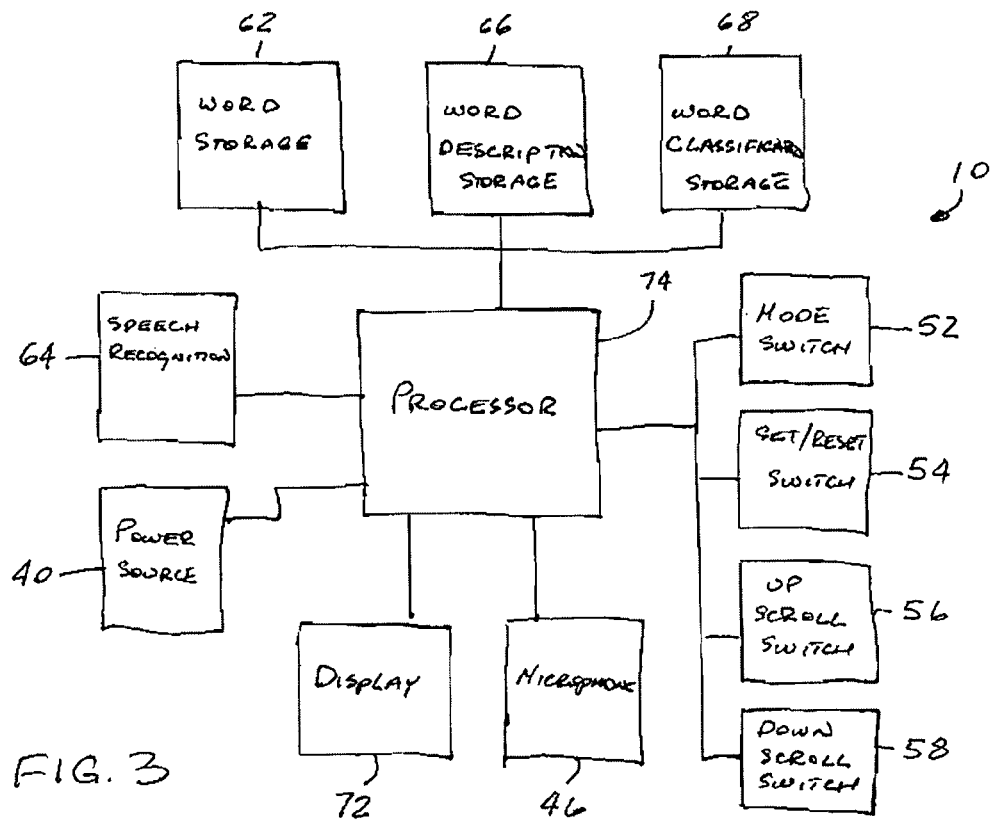
FIG. 3 is a block diagram of the device of FIG. 1.

Reference is now made, to FIGS. 1-3, wherein there is shown handheld voice activated spelling device, generally designated 10. The device 10 includes a housing 20 having each of a predetermined size and a predetermined shape and having a front surface 22 and a rear surface 24. A cover 30 is secured to one end of the housing 20 for selectively covering and uncovering the front surface 22. In the presently preferred embodiment invention, the cover 30 is secured by way of a hinge 32 which is well known in the art of handheld devices such as mobile phones, Personal Communication Devices (PDAs), pagers, pedometers and the like and therefore its detail description is omitted for the sake of brevity. Alternatively, the cover 30 can be secured in a sliding mode which is also well known in the art of mobile phones. A means such as a clip 38, may be secured to the rear surface 24 of the housing 20 for attaching the device 10 to an article of clothing, carrying strap and the like.

A power source 40 is mounted within the housing 20. The presently preferred power source is a disk shaped lithium battery which is disposed toward the rear surface 24 and which is preferably accessed by removing a battery cover 42.

There is a microphone means which is provided for receiving acoustic waves each characterizing a specific word spoken by a user and converting the acoustic waves into electronic signals. In a conventional manner, such microphone means includes a microphone 46 which is preferably mounted within the housing 20 and aligned with a microphone port 48 which is formed through the front surface 22. Equally as well, the microphone 46 may be disposed within the cover 30 and the port 48 may be formed through an interior surface 34 thereof.

User control switches are arranged in a predetermined pattern and are preferably operable from the front surface 22 of the housing 20. In the presently preferred embodiment of the invention, there are provided four control switches: mode switch 52, set/reset switch 54, up scroll switch 56 and down scroll switch 58. Preferably, the control switches are of a button type, although it is within the scope of the present invention to use other switch types, for example such as touch switches.

A first memory means 62 having a plurality of words stored therein is mounted within the housing 20. A speech recognition means 64 is coupled to the microphone means and to the first memory means 62. The speech recognition means 64 is responsive to the electronic signals generated by the microphone means for selecting at least one word from the first memory means 62 representative of the specific word spoken by the user. A second memory means 66 is coupled to the first memory means 62 and has a plurality of word definitions stored therein. Each word definition is associated with a respective word stored in the first memory 62, the second memory means 66 being responsive to one of the plurality of control switches for providing each word definition. Optionally, the device 10 may include a third memory means 68 coupled to at least one of the first memory means 62 and the second memory means 66 and having a plurality of word classifications stored therein. Each word classification is associated with the respective word stored in the first memory means 62 or the respective word definition stored within the second memory means 66. The third memory means 68 is being responsive to another one of the plurality of control switches for providing a related word classification. The plurality of word classifications includes nouns, pronouns, verbs, adjectives, adverbs, prepositions, conjunctions, interjections, and articles. In a conventional manner, the memory means 62, 66 and 68 and the speech recognition means 64 are provided in a digital processor-enabled form utilizing electronic circuit architecture. It is within the scope of the present invention to employ presently available speech recognition apparatuses and/or systems. By way of an example only, such speech recognition means 64 may be of a type disclosed in U.S. Pat. No. 6,304,844 suitable for use in handheld mobile communication devices. Teachings of U.S. Pat. No. 6,304,844 are incorporated into this document by reference thereto.

A display means is mounted within the housing 20 and has a display 72 viewable from the front surface 22 thereof. The display means 70 is coupled to the memory means 62, 66 and 68 for displaying the plurality of words, the plurality of word definitions and/or plurality of word classifications when the user operates a selected control switch. Preferably, the display 70 is of a liquid-crystal display (LCD) type.

The device 10 may also include an optional means for generating chronological date and means for generating chronological time, for example being integrated into the processor 74, and wherein a further one of the plurality of control switches is operable to display at least one of the date and time and yet a further one of the plurality of control switches is operable to set or reset the at least one of the date and time.

The device 10 may further include a set of instructions 80 for operating the device. Preferably, the set of instructions 80 is disposed on an interior surface 34 of the cover 30. The set of instructions may include at least one of a text and graphical instruction.

In operation, the user first activates the device 10 either by simply opening the cover 30 and/or by using one of the control switches. For example, the mode switch 52 may be used for activating and deactivating the device 10. When the device 10 is activated, the user simply speaks the word into the direction of the microphone port 48. Responsive to the spoken word, the speech recognition means 64 receives and processes acoustic waves representing the spoken word and selects directly or through the processor 74 the word spelling from the first memory means 62 which is displayed on the display 72. The user may then press the mode switch 52 again to obtain the related word definition stored within the second memory means 66 and press the mode switch 52 further to obtain the word classification stored within the third memory means 68. After the spelling of the spoken word has been displayed and used for desired purpose, the user can simply press the mode switch 52 to deactivate the device 10 or the device 10 can be programmed, by way of the processor 74, to self-deactivate after a predetermined period of time to conserve the power source 40.

When the device 10 is also used for displaying the date and time, the mode switch 52 will be also employed for switching the display 72 to display date and time. Accordingly, a set/reset switch 54 will be provided to set/reset desired date and time.

Since it will be appreciated that in many languages, for example as in English language, a single spoken word may be spelled differently due to hidden letters or sound combinations and can further have various meanings and uses, the device 10 is adapted to display a plurality of words related to the spoken word and enable the user to select the intended word spelling. After the spelling mode is selected by way of the mode switch 52 and the plurality of the matching words are displayed on the display 72, the user may employ the scroll switches 56 and 58 to navigate between the displayed words in order to choose the intended word spelling. Since for many, it is necessary to know proper use and type of the selected spelled word, the user can press set/reset switch 54 to display at least one definition of the selected word and use the scroll switches 56 and 58 to navigate between more than one definition and use and use the set/reset switch 54 again to determine the classification of the spelled word based on a particular definition.

When the device 10 is contemplated for use with more than one language, the mode switch 52 will be adapted to display a plurality of language selections on the display 72 with set/reset switch 54 and scroll switches 66, 68 employed to select a desired language from such plurality of displayed language selections. It will be appreciated that the memory means 62, 66 and 68 as well as the speech recognition means 64 will be then adapted for employment with the selected language.

It is also within the scope of the present invention, to provide means for teaching the device 10 on the pronunciation and/or dialect of the user. Accordingly, the mode switch 52 will be further employed to switch to a teaching mode with the user then speaking preselected words into the microphone 46.

Thus, the handheld voice activated spelling device 10 of the present invention provides a device which is simple to operate by the user to determine the correct spelling of the spoken word based on use of the word definition and word classification databases. The handled device 10 is preferably of a size about 2.5 inches wide and 2.5 inches long with cover 30 being in closed position and with housing 20 and cover 30 manufactured from plastic materials thus providing the user with convenient and light weight device which can be simply attached to a belt, strap of the backpack or purse or simply placed into a pocket for ease of access and use.

It would be appreciated that the method of determining proper word spelling aided by providing word definition and word classification may be advantageous for use with other devices and systems.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. A handheld voice activated spelling device consisting of:
   (a) a housing having a front surface and an opposed rear surface;
   (b) a cover secured to said housing for selectively covering and uncovering said front surface;
   (c) a power source mounted within said housing;
   (d) a processor;
   (e) a microphone means for receiving acoustic waves, each characterizing a specific word spoken by a user, and converting said acoustic waves into electronic signals, said microphone means including a microphone port positioned adjacent an edge of said housing;
   (f) a first memory having a plurality of words stored therein;
   (g) a quartet and only quartet of switches arranged in a rectangular pattern and positioned in said front surface between said display means and said edge of said housing having said microphone port positioned adjacent thereto, said quartet of switches including a mode control switch configured to activate or deactivate said device, configure said device for either one of spelling or teaching mode operation, display at least one of date and time, display a plurality of languages and obtain at least a definition and a classification for each of said plurality of words stored in said first memory, a set and reset control switch configured to obtain said at least said definition and said classification and reset said at least one of date and time, a first scroll control switch and a second scroll control switch;
   (h) a speech recognition means coupled to said microphone means and to said first memory, said speech recognition means responsive to said electronic signals for selecting at least one word from said first memory, said at least one word representative of said specific word pronounced by the user;
   (i) a second memory coupled to said first memory and having a plurality of word definitions stored therein, each associated with a respective word stored in said first memory, said second memory being responsive to either one of said mode control switch or said set and reset switch for providing said each word definition;
   (j) a third memory coupled to at least one of said first memory and said second memory and having a plurality of word classifications stored therein, each associated with said respective word stored in said first memory or said respective word definition stored within said second memory, said third memory providing said each word classification when the user operates either one of said mode control switch or said set and reset switch after selecting said each word definition;
   (k) a plurality of languages selectable by the user operating either one of said mode switch or said set and reset switch;
   (l) a display mounted within said housing and viewable from said front surface thereof, said display coupled to each of said first, second and third memories and said quartet and only quartet of switches, said display responsive thereto for respectively displaying said plurality of words, said plurality of word definitions and said word classifications when the user operates said at least one of said quartet of switches;
   (m) a hinge connecting one end of said cover to an edge of said housing disposed opposite from said edge having said port positioned adjacent thereto; and
   (n) means for generating at least one of a chronological date and chronological time, each of which is displayed on said display.

2. The device, according to claim 1, wherein said word classifications include nouns, pronouns, verbs, adjectives, adverbs, prepositions, conjunctions, interjections, and articles.

3. The device, according to claim 1, wherein said display is a liquid-crystal display.

* * * * *